United States Patent [19]

Dodt et al.

[11] 4,251,885
[45] Feb. 17, 1981

[54] CHECKING PROGRAMMED CONTROLLER OPERATION

[75] Inventors: William C. Dodt, Broomfield; Edward P. Lutter, Boulder, both of Colo.

[73] Assignee: International Business Machines Corporation, Armonk, N.Y.

[21] Appl. No.: 18,976

[22] Filed: Mar. 9, 1979

[51] Int. Cl.³ .............................................. G06F 11/00
[52] U.S. Cl. .................................... 371/60; 364/900; 371/16; 371/53
[58] Field of Search ....................... 364/119, 200, 900; 340/146.1 AJ; 235/304, 304.1, 304.2; 371/53, 60, 16

[56] References Cited

U.S. PATENT DOCUMENTS

| | | | |
|---|---|---|---|
| 3,825,903 | 7/1974 | Brown | 364/200 |
| 4,053,752 | 10/1977 | DeJohn et al. | 364/200 |
| 4,142,243 | 2/1979 | Bishop | 235/304.1 |
| 4,158,226 | 6/1979 | Struger et al. | 364/119 |

OTHER PUBLICATIONS

Vermot-Gauchy, Program Checking Method, IBM Technical Disclosure Bullentin, vol. 14, No. 10, Mar. 1972, pp. 3187-3188.
Crandall and Nelson, Dynamic Self-Checking for a Read-Only Storage, IBM Technical Disclosure Bulletin, vol. 19, No. 8, Jan. 1977, pp. 2868-2869.
Greenberg, Control Word Error Correction, IBM Technical Disclosure Bulletin, vol. 13, No. 5, Oct. 1970, pp. 1357-1358.
Glickstein, Weighted Checksum to Detect and Restore Altered Bits in Computer Memory, IBM Tech. Discl. Bulletin, vol. 13, No. 10, Mar. 1971, pp. 3146-3147.
Boggs, Jr., Separate Store Protect and Fetch Protect, IBM Technical Disclosure Bulletin, vol. 19, No. 1, Jun. 1976, pp. 71.
Zick, Two-Mode Storage Protection Mechanisms, IBM Technical Disclosure Bulletin, vol. 19, No. 2, Jul. 1976, pp. 425.

*Primary Examiner*—Charles E. Atkinson
*Attorney, Agent, or Firm*—Herbert F. Somermeyer

[57] ABSTRACT

Programmed controllers execute sequences of control functions for controlling a device. External noise can cause controller malfunctions on critically operated devices. Proper sequencing is verified by assigning access key/check codes to particular sequences. A check key code is generated during execution of a sequence only if the sequence is properly executed by the programmed controller. At completion of the control sequence, the generated code is compared with the access or original code for verifying appropriate programmed controller sequencing. Several sequences can be embedded or nested in each other, each having its own check key with the overall sequence also having an independent check key.

6 Claims, 12 Drawing Figures

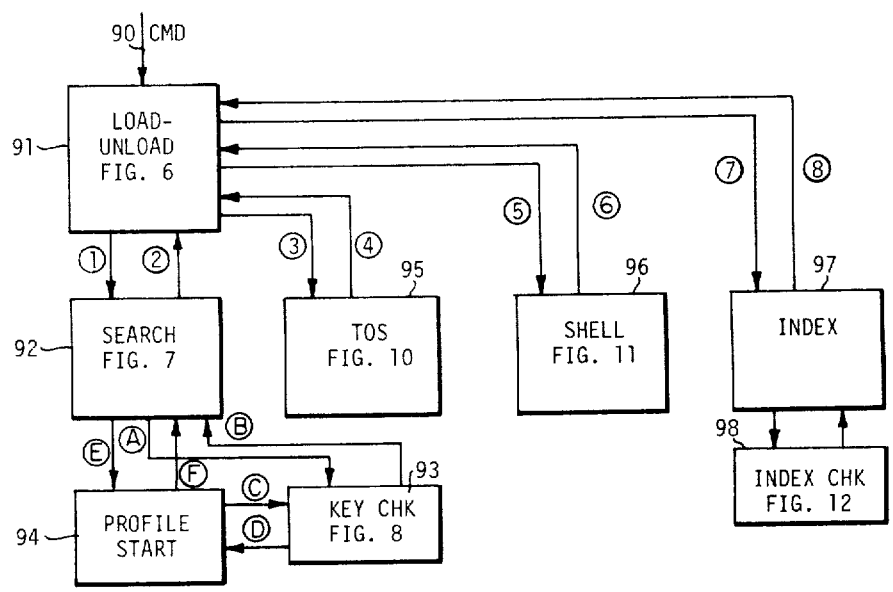
FIG. 5
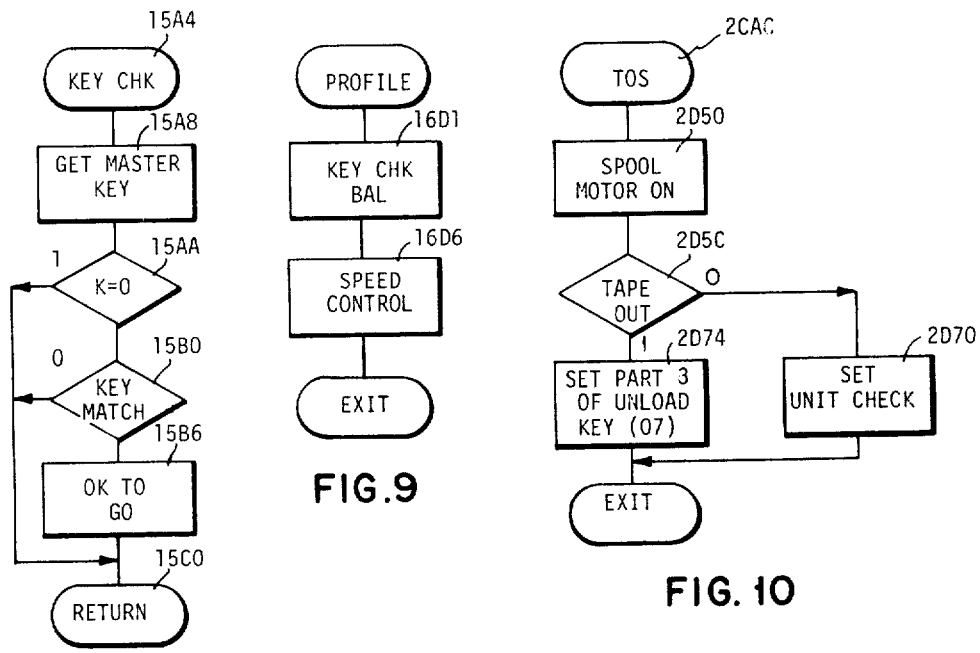
FIG. 8
FIG. 9
FIG. 10

CHECKING PROGRAMMED CONTROLLER OPERATION

BACKGROUND OF THE INVENTION

Present invention relates to programmed controllers, particularly those controllers that operate with processes and/or electromechanical devices. More particularly, the invention relates to verification of proper operation of such programmed controllers.

Many control devices have diverse checking systems, for example, in transmitting control characters between a controller and a controlled device, the controlled device often can send back a verification of the received command either by a special code or by a replica of the command. While this verification assures adequate transmission between a controller and a controlled device, it does not ensure that the programmed controller itself has been properly functioning.

In many programmed control devices, access keys are used to verify that access to a particular portion of memory, for example, is authorized. This access control prevents inadvertent access to critical portions of memory. Such access keys do not ensure that once memory is accessed, that the proper sequence of operation has been appropriately performed.

Also, check symbols, etc. have been used for identifying accessing mechanisms for security purposes. Again, while this does protect devices from improper controls in a limited sense, it does not ensure that the accessing mechanism is properly executing its control functions.

SUMMARY OF THE INVENTION

It is an object of the invention to provide a programmed controller that is self-verifying in that a proper sequence of operations have to be performed in a control area for properly controlling a controlled device. A method for implementing such a verification includes providing a check key and storing the check key at a predetermined memory location having a predetermined addressing relationship to an end instruction word location of a control program to be executed; i.e., having a predetermined logical relationship to an end step of a control sequence. The control sequence is executed, such as by executing a control program of instructions, whereby the controlled device is operated in accordance with the control sequence. At predetermined points of the execution of the control sequence, the programmed controller generates portions of a check key for later verifying proper control sequence execution. This may occur at one or more points of the control sequence. At the last instruction word location a check key has been generated whenever the control sequence has been correctly executed; then the programmed controller compares the generated check key with the stored check key for verifying the proper programmed control operation. The invention comprises both a method and apparatus for achieving the above method steps, the invention further includes nesting such verification steps. Such control sequences will have corresponding nested check keys. Each request will have its own unique check key in a given programmed controller. Not all control sequences need be so checked within a controller, i.e., critical sequences only may be checked.

The foregoing and other objects, features, and advantages of the invention will now be apparent from the following more particular description of preferred embodiments of the invention as illustrated in the accompanying drawings.

BRIEF DESCRIPTION OF THE DRAWING

FIG. 5 is a block diagram of control showing a sequence of operations for the FIG. 1 illustrated apparatus.

FIG. 8 is a key check logic flow diagram for use with the FIG. 1 illustrated apparatus.

FIG. 9 is a profile logic flow diagram.

FIG. 10 is a tape on spool (TOS) logic flow diagram of the FIG. 1 illustrated apparatus.

DETAILED DESCRIPTION

Figure 1:
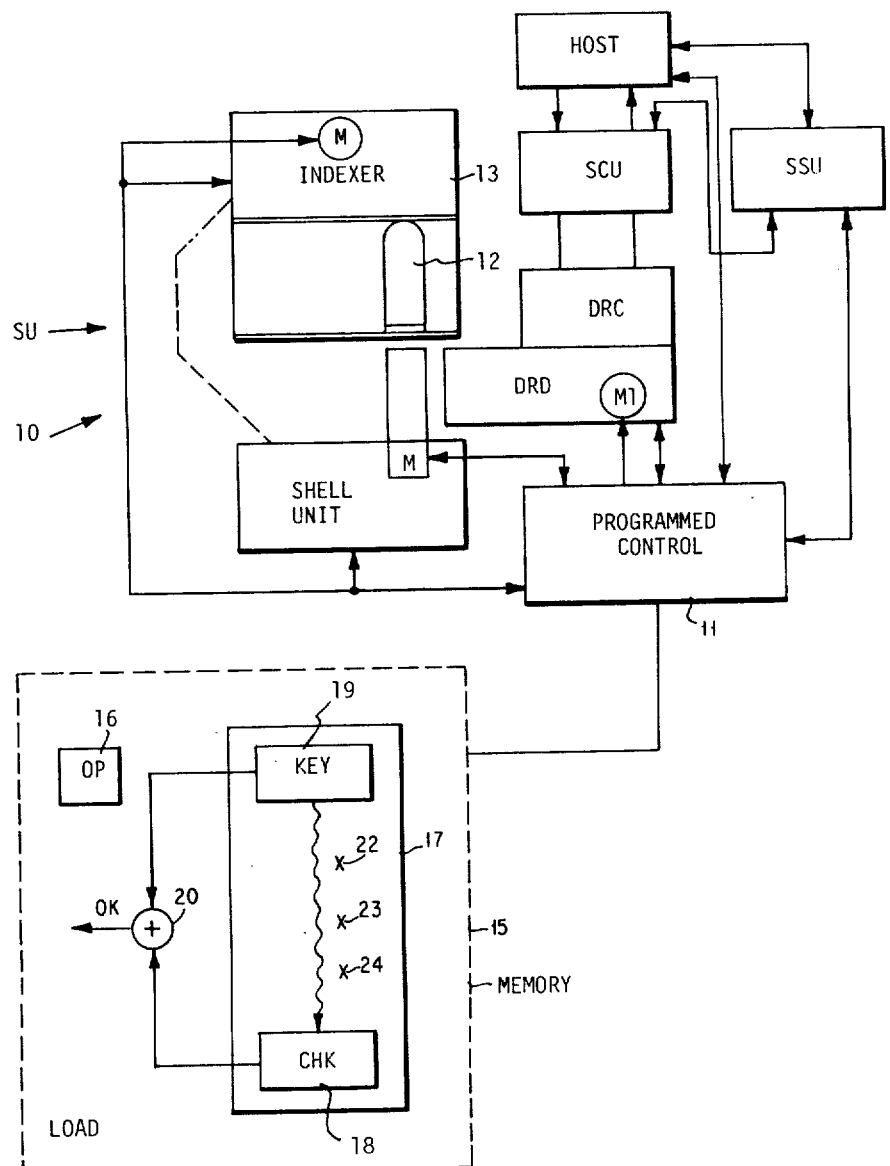
FIG. 1 is a diagrammatic block showing of an implementation of the present invention in an automatic recorder environment.

Referring now, more particularly, to the drawing like numerals indicate like parts and structural features in the various diagrams. An ilustrative embodiment of the present invention concerns controlling an automatic recorder for storage unit (SU) 10 having a programmed control 11 for sequencing and otherwise controlling the operation of SU 10, as well as responding to commands as will become apparent. SU 10 includes a data recording device DRD, such as shown in U.S. Pat. No. 3,850,358, connected to a set of electronic circuits termed DRC (data recording control); thence to storage control unit SCU to one or more hosts, such as digital computers or CPU's. SU 10 is installed in a tape library system such as shown in Burke et al 2,941,738 which is controlled in accordance with Beach et al 3,831,197. The tape library has a data cartridge 12, as shown in U.S. Pat. No. 3,837,690, which is automatically transferred from a storage location in the tape library to SU 10 for data recording and reading. The apparatus which receives data cartridge 12 indexes it to an appropriate location for DRD to record and reproduce signals on a magnetic media carried by the data cartridge 12, such as shown in U.S. Pat. No. 4,011,587. All of these operations are automatically controlled under program control 11. For example, motor M in the indexer 13 is so controlled, as will become apparent.

The FIG. 1 illustrated apparatus further includes a set of DASD storage units forming a second level storage unit (SSU). SSU communicates with SCU, the host and with programmed control 11 such as shown and described in DeJohn et al U.S. Pat. No. 4,053,752. The SCU unit can be referred to as a staging adapter unit of DeJohn et al patent. Programmed control 11 is favorably compared with MSC of DeJohn et al, supra.

Programmed control 11 includes a control memory 15 which contains lists of instruction words constituting a control program for operating SU 10 as well as coordinating operation of units SSU, STU, DRD, DRC and SU 10. In a practical embodiment, memory 15 would be overlayed by computer programs fetched from SSU, therefore, its program content is those programs which have to be executed by program control 11 for the functions at hand. It is to be understood that the FIG. 1 illustration contemplates a large number of programs of diverse types. These are simply represented in memory 15 as other programs OP 16. The illustrated program in memory 15 is a program of a critical type for controlling automatic recorder SU 10. It can be one of several functions as will become apparent from the ensuing description. At a first memory location at a so-called beginning end of program 17, a register 19 contains a key code. Such key code is loaded into program 17 when the program is first loaded into the machine, i.e., to access program 17, programmed control 11 has generated or fetched a key from a requesting program (not shown). Programmed control 11 then compares the key in program 17 with the generated key to determine whether or not the requesting program should enable programmed control 11 to access program 17. If yes, then programmed control 11 loads a check key which may be the same as the access key, into any memory location having a predetermined address relationship to the last computer instruction in program 17. It may constitute a one or two byte register in the memory 15 at the immediate end portion of the registers holding the instruction words constituting program 17. Symbol 20 represents the compare function executed by programmed control 11 upon completion of the execution of computer program 17 for comparing the key at 19 with the key at 18, as well as the key not shown generated by the execution of the program 17. If there is a favorable comparison, then the sequence of operations commanded by programmed control 11 as a function of executing program 17 has occurred in an appropriate sequence. The key, to check the proper execution of control sequence, is generated during execution of program 17 by programmed control 11 by generating partial keys at the x points 22, 23 and 24 of program 17 as will become apparent. These so-called x-points are chosen to correspond to critical portions of the sequence of operations currently being controlled by programmed control 11.

The generated verification key can be generated in any one of a plurality of ways. For example, if the check key is 236, then the number 2 could be generated at 22, number 6 at 23, and the number 3 at 24. Alternatively, the numbers 2, 3 and 6 could be broken into their binary components such as is usual in digital computers, with a portion of number 2 being generated at all three x-points 22, 23, 24 with the same type of number generation being applied to numerals 3 and 6. Alternatively, numbers can be generated and added together at points 22, 23 and 24 to generate the numeral 236. Therefore, either arithmetic or logical operations can generate a verification key. Also, a combination of arithmetic and logical manipulations can be employed. For example, between x-points 22 and 23, arithmetic operations can be employed to generate a partial key with the partial key being combined with other partial keys in a logical manner, such as a dot OR logic function. Exclusive OR and other logical manipulations may also be employed to combine partially generated verification keys.

Figure 2:
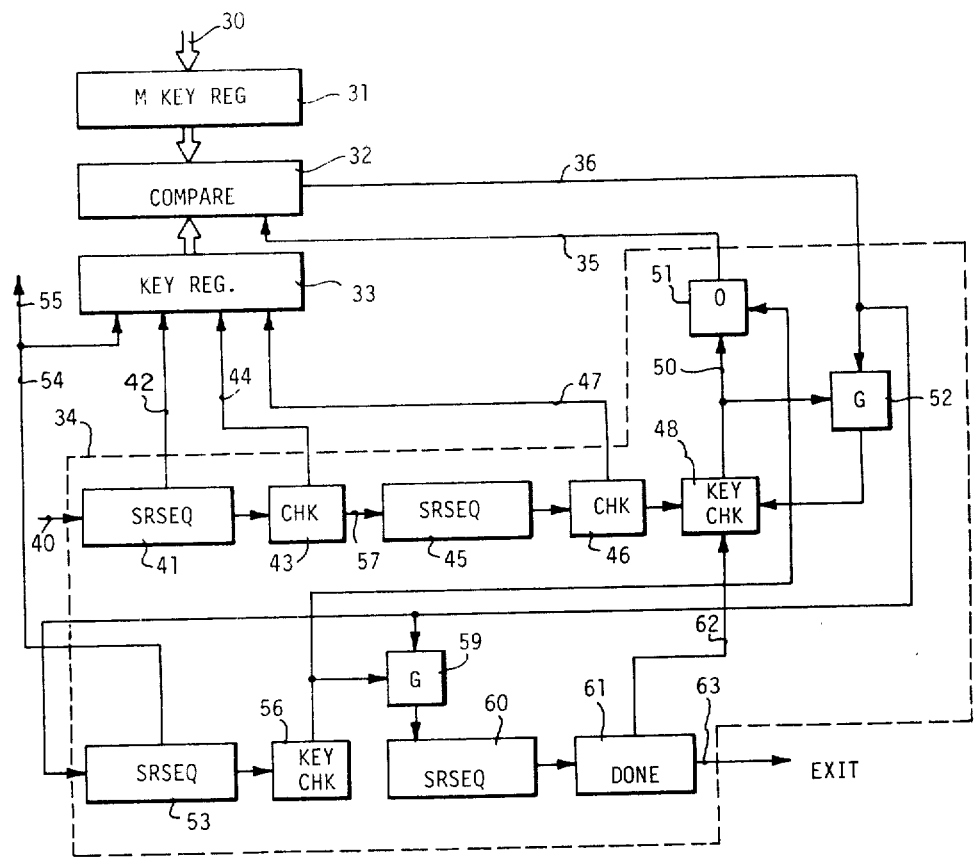
FIG. 2 is a block diagram of a hardware sequence programmed controller using the present invention.

FIG. 2 illustrates a hardware logic version of the invention, it being understood that the best mode of practicing the invention is using a programmed digital computer. The FIG. 2 illustrated circuits are located within DRC of FIG. 1. A match key, such as a bit pattern received by the DRC from SCU or the host over cable 30, is loaded into the MKEY key register 31. Compare circuit 32 receives the bit pattern from register 31. Circuit 32 compares favorably with the compare function 20 of FIG. 1. The generated key register 33 receives the sequence generated key from the sequence control and checking circuit 34 and supplies the generated pattern to compare circuit 32. Compare circuit 32, as will become apparent, receives an activating signal over line 35 from control 34 for effecting compare function 20. Upon a successful compare, circuit 32 supplies an okay signal over line 36 back to control 34.

Control 34 is initially activated by a request signal received over line 40 from DRC circuits (not shown). The first shift register sequencing circuit 41, constructed as a normal shift register counter, sequences operations of the DRC to be controlled such as motor M is controlled by programmed control 11 of FIG. 1. In the alternative, shift register 41 may be a linear feedback shift register of known design. In any event, upon initiation of the sequences controlled by shift register 41, the shift register supplies an output signal over line 42 to set a predetermined portion of key register 33. For example, bit position 5 of register 33 may be set to a 1 condition. Upon completion of the sequence register 41 controlled sequence, check circuit 43 verifies successful operation of the sequence and then emits a second key generated signal over line 44 to set, for example, bit position 6, of register 33. Check circuit 43 also activates second shift register 45 to time a second portion of the control 34 controlled sequence. Shift register 45 can be constructed identical to register 41. Register 45 supplies no key setting signals to key register 43. Upon completion of the shift register 45 controlled sequences, check circuit 46 verifies successful completion of that portion of the control 34 control sequence and then emits a third key setting signal over line 47 to said bit position 0 of key register 33. Check circuit 46 (identical to circuit 43) can be an AND gate (not shown) with a delay circuit (not shown) for allowing the signal on line 47 to proceed prior to activating the key check circuit 48; thereby circuit 46 includes self-timed operation as is well known in so-called hard logic circuits. Key check circuit 48 may be a flip flop (not shown) set to the active condition by the output circuit signal of check circuit 46. Key check circuit 48 when set to the active condition supplies a completion signal for activating compare 32 over line 50 to line 35 via OR circuit 51. The line 50 signal also enables AND gate 52 to pass the compare signal on line 36 to reset key check circuit 48 and to activate a subsequent shift register sequence controlled by shift register 53. Shift register 53 supplies an additional key generating signal over line 54 to set a predetermined number of bits in the key register 33 to the 1 state and to reset the bit 6 position previously set by line 42 signal. In this manner, a more complex key checking is provided in key register 33. Additionally, the line 54 signal also travels over line 55 to actuate circuits (not shown) for loading a second key into M key register 31 via cable 30.

Upon completion of the shift register sequence controlled by register 53, key check circuit 56 constructed identical to circuits 43 and 46, supplies an activating signal over line 57 to enable AND gate 59 and to activate the compare circuit 32 via line 35 and OR circuit 51. AND gate 59 passes the compare 32 generated line 36 signal to activate the shift register sequence controlled by shift register 60. Shift register 60, as shift register 45, does not affect the key register 33. Upon completion of this non-critical sequence, shift register 60 supplies an activating signal to set the done circuit 61, a flip flop, to the active condition. Circuit 61 supplies an end signal over line 62 to clear the key check circuit 48 and supplies a completion signal over line 63 such that subsequent sequences (not shown or described) can be executed by a programmed control line. The just described sequences may be used by programmed control 11 to control motor M and as well as DRC to control sequences relating to methods of connecting hosts to the DRD for accessing data as previously described.

From a further examination of FIG. 2, it is apparent that the key register 33 can be altered by a plurality of independent sequences at various stages of sequence execution with an intermediate key check, such as provided by key check circuit 48, and a final key check, as achieved by the output signal from key check circuit 56. Various hierarchies of checking can be employed using the principles set forth in FIG. 2, it being understood that the best mode of the invention is preferably performed in a programmed unit either of programmed arrays or a more conventional computer.

Figure 3:
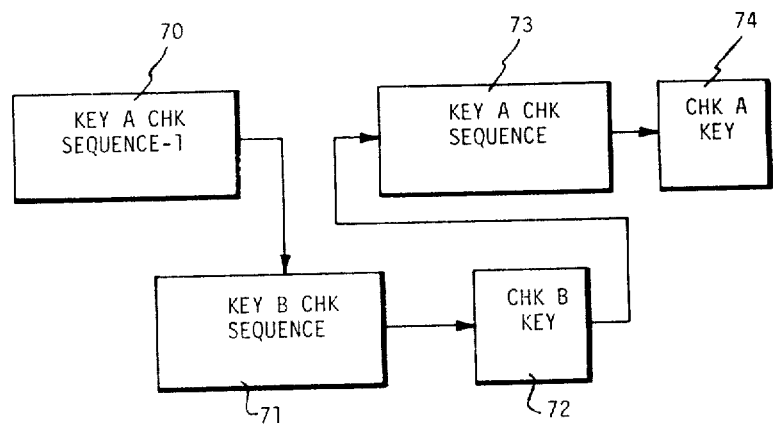
FIG. 3 shows a two-level hierarchy of control sequences employing the present invention with independent checks for the hierarchy of sequences.

An example of plural key check sequences is shown in FIG. 3 wherein different keys are employed, for example, keys A and B. Circuit 70 generates a first portion of key A check in a sequence 1. Following completion of the sequence 1, a second sequence 71 generates a B key check which is then verified at 72. At this point in time, the sequence 70 has not yet been checked with key A. Following successful checks of key B, a second key A generating sequence 73 is executed. The A key is then checked at 74. FIG. 3 stands for the proposition that key checking can be interleaved in an independent manner, as well as a dependent manner, as described with respect to FIG. 2.

Figure 4:
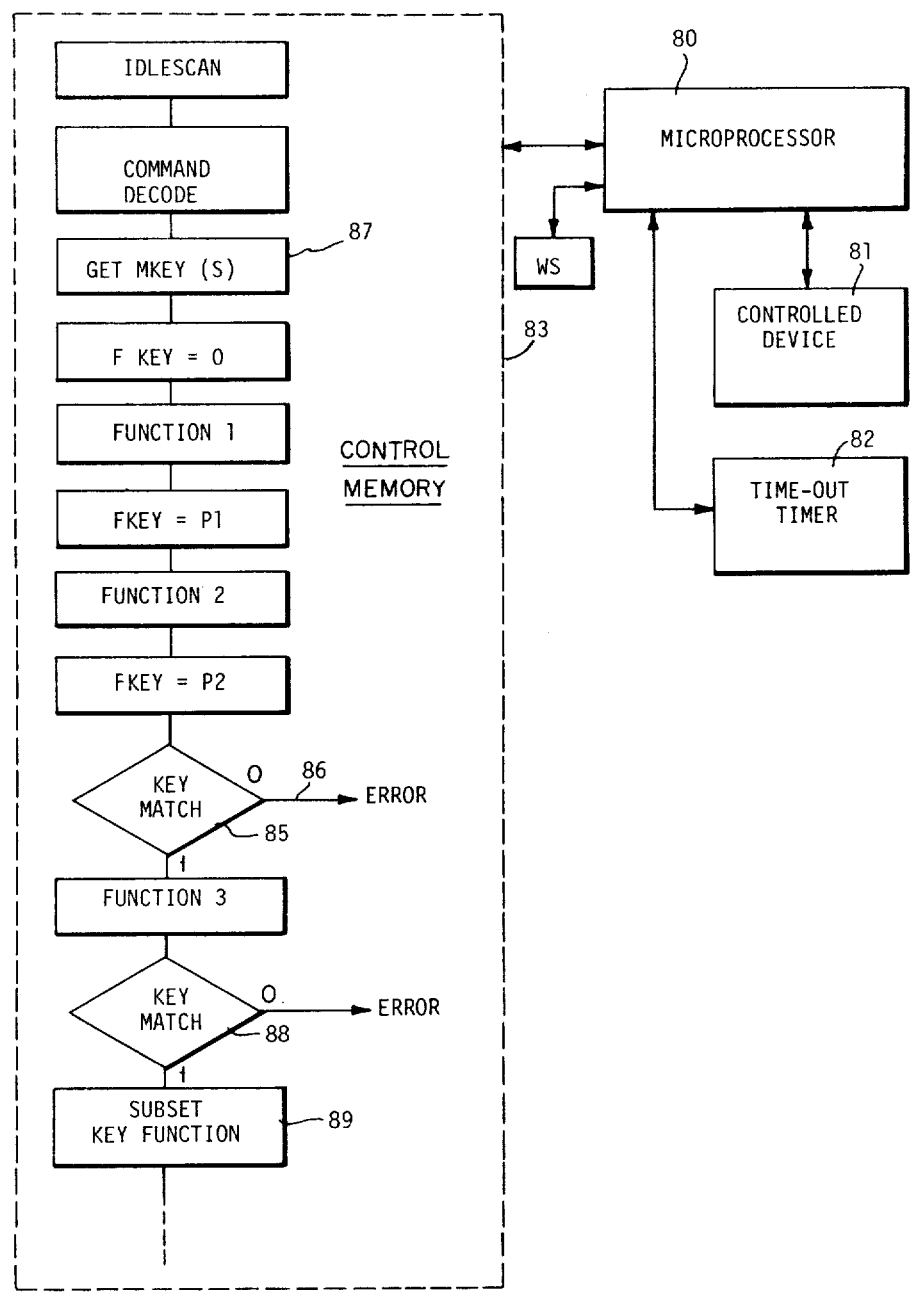
FIG. 4 is a block diagram showing a preferred embodiment of the present invention employing a programmed digital computer.

FIG. 4 is a simplified diagram illustrating a best mode of the present invention. FIG. 4 illustrates a preferred simplified description of the programmed control 11 shown in FIG. 1. A microprocessor 80, such as the Motorola M6800, includes I/O circuits (not shown) connecting microprocessor 80 to a controlled device 81, such as a motor M. Microprocessor 80 also controls time-out timer 82 for initiating a predetermined time out in relationship to predetermined operations of controlled device 81. Upon completion of every time out by timer 82, an interrupt is supplied to microprocessor 80 indicating a fault condition with respect to controlled device 81. Microprocessor 80 is also connected to control memory 83 which includes a plurality of sequences of instructions including critical sequences of instructions which use the present invention for verifying proper sequences of execution. Microprocessor 80 also includes a working store and other connections all of which are not shown, but are well known in the computer arts.

The illustrated sequence of instructions in control memory 83 is a critical sequence, such as for controlling the high speed search by DRD of FIG. 1. The criticalness of such a high speed search is that the motor does not pull the tape off the spool at the end of the spool. Microprocessor 80 operates in an idle mode using a so-called idlescan routine which merely senses for interrupts, calls, received commands, and the like. Such scans are well known in the computer arts and are not described for that reason. Upon the receipt of a command from a host controller or from another program within microprocessor 80, the command is decoded using a predetermined sequence of instructions. Such command decoding is well known. Microprocessor 80 determines from the decoded command that a critical sequence of operations is to be performed. It then gets the M keys (step 87) and loads same into an M key register within the working store WS, a semi-conductor random access memory. A second register F key (not shown) within working store WS is set to 0. A first function, function 1, controlled by the execution of the function 1 program by microprocessor 80 is forced on controlled device 81. Upon completion of function 1, the F key is set to a first value P1. This last operation is an intermediate key generation indicating successful operation of but a portion of the entire critical operation.

Following setting P1 into the F key register of WS, a second function of controlled device 81 is initiated by the execution of the function 2 sequence of instructions. Upon successful completion of function 2, which corresponds with the completion of the function 2 sequence of instructions, the F key register is then set to P2. In this regard, a numerical value may be arithmetically added to the value P1, may be logically added or multiplied such as using modulo 2 arithmetic or merely superimposed on P1. Then branch instruction 85 is executed. If there is a non-compare between the M key with the F key, an error is indicated by microprocessor 80 as indicated by line 86. Upon a successful key match, function 3 of controlled device 81 is performed by executing the function 3 sequence of instructions. This sequence of instructions includes modifying the M key register or selecting a second match key. In other words, the M key fetching at 87 may fetch 1 or 2 keys to be successfully used in the various branch instructions 85, 88, etc.

Following a successful compare in branch instruction 88, a subset key function set of instructions are executed at 89. Such subset key function 89 corresponds in FIG. 3 to the B sequences 71 and 72; that is, it provides an independent subset key checking as opposed to the dependent key checking as shown in FIG. 2. Such key checking includes checking a plurality of interdependent sequences as well as independent sequences of controlled device 81. For example, in the FIG. 1 illustration, a plurality of units are controlled by programmed control 11 in a predetermined sequence of mechanical and electromechanical operations, all of which can be critical and are checked.

Figure 11:
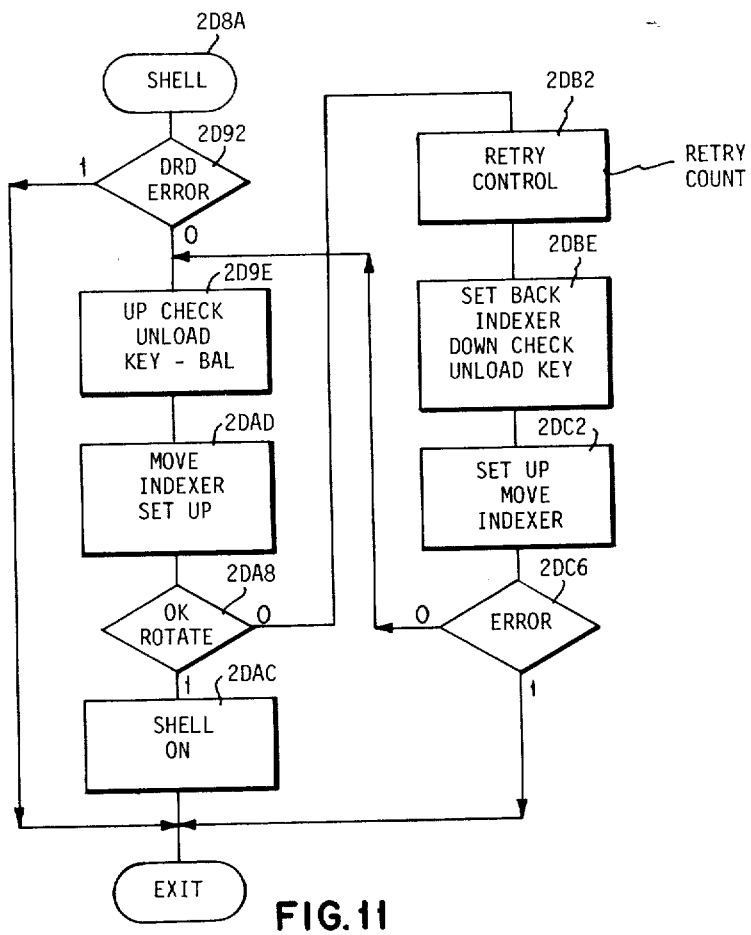
FIG. 11 is a shell logic flow diagram showing the stripping of a cartridge cover from a cartridge as performed by the automatic recorder illustrated in FIG. 1.

FIG. 5 is a flow chart illustrating the operation of the FIG. 1 illustrated apparatus in these regards. The command at 90 to programmed control 11 indicates that data cartridge 12 is to be loaded into the recorder SU for data recording and readback operations. The data cartridge 12 must then be loaded into the SU while another data cartridge (not shown) is simultaneously unloaded, such as shown in the patents referred to hereinabove with respect to a DRD. The load/unload function of 91 is illustrated in logic form in FIG. 6. A search function 92 is shown in FIG. 7. The key check sequence of instructions operable with the search set of instructions 92 is shown in FIG. 8 and identified in FIG. 5 by numeral 93. The profiled start of motor M of FIG. 1 is checked by program 94 and is activated by the search program 92. Microprocessor 80 of programmed control 11 also uses the key check program 93 to generate diverse partial keys at diverse levels of checking for a plural subset usage of the key check program 93. That is, program 93 is repeatedly used for different key checks. Following the start 94 of the part of the search 92, a tape on spool-TOS 95 program of instructions is executed as shown in FIG. 10. In the illustrated implementation, the TOS program generates an independent part of a check key. FIG. 11 illustrates shell program 96 which controls the DRD in taking the dust protective shell cover from the spool. Finally, the index program 97 (not shown in detail) enables programmed control 11, which includes microprocessor 80, to move an indexing mechanism of DRD for rotating the data cartridge 12, as shown in the above referenced patents. Index check program 98 does the final keymatching operation, as will become apparent.

Figure 6:
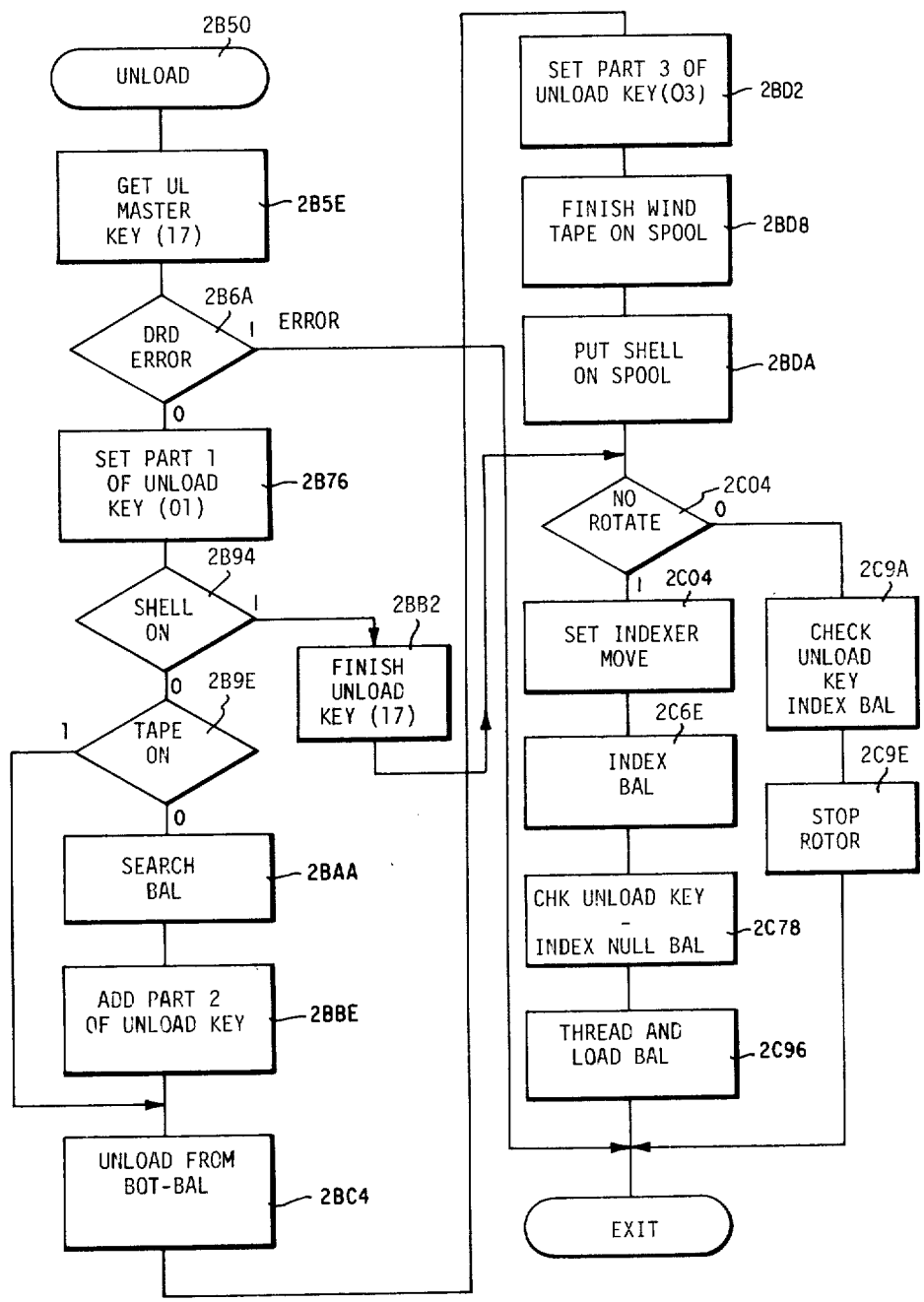
FIG. 6 is a functional logic diagram of an unload sequence of the FIG. 1 illustrated apparatus.
Figure 7:
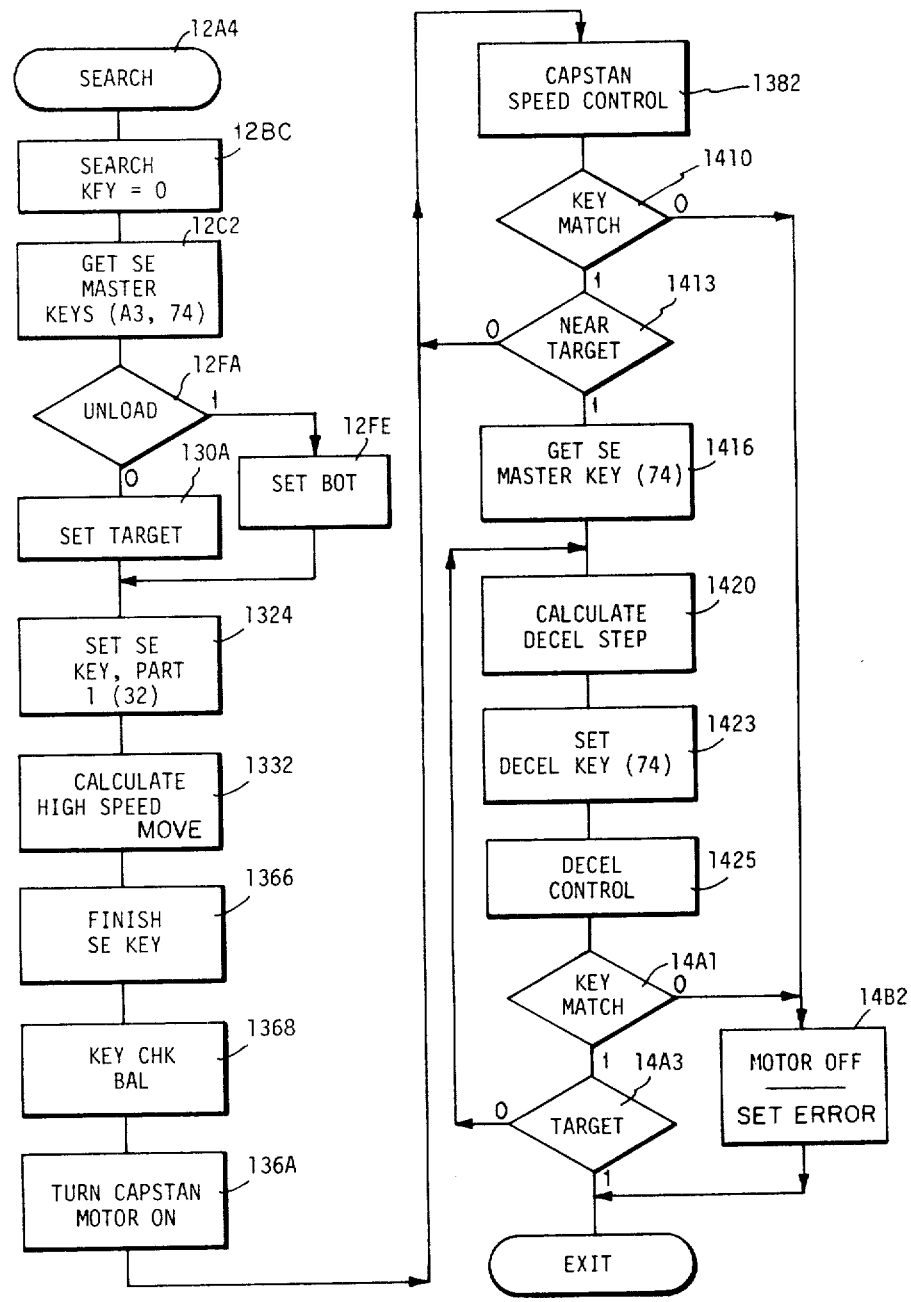
FIG. 7 is a tape search logic flow diagram for use with the FIG. 1 illustrated apparatus which employs the present invention.

Referring next to FIG. 6, the unload sequence of instructions at a computer instruction level, such as for the Motorola M6800, is shown in flow chart form. The numerals associated with each of the flow chart steps refers to a memory location in control memory 83 wherein the instruction word is stored. The program is entered at 2B50. The unload master key, numerical 17, is fetched via the instruction at 2B5E. Microprocessor 80 at 2B6A executes a branch instruction to check for a DRD error condition. If there is an error, the program is immediately exited for error recovery procedures beyond the scope of the present application. If there is no error, then the microprocessor 80 at 2B76 sets part 1 of the unload key to be generated. This value is numerical 01. Microprocessor 80 at 2B94 then detects whether or not the shell or cover is still on the data cartridge 12. If it is, then the data cartridge 12 is ready to be indexed and the unload key is then finished at 2BB2. If the shell is not on, more unloading functions are yet to be performed by the DRD. Microprocessor 80 at branch instruction 2B9E detects whether or not the tape is still on the machine spool (not shown) of the DRD, i.e., the tape still has to be wound onto the spool (not shown) data cartridge 12. If the tape is not on, the machine spool (not shown) then at 2BAA microprocessor 80 branch and links (BAL) to the search program illustrated in FIG. 7. Following the FIG. 7 search program, microprocessor 80 adds part 2 of the unload key to the F key register (not shown, but in WS) by the transfer instruction at 2BBE.

On the other hand, if the tape was on the machine spool at 2B9E, then at the completion of transfer instruction 2BBE an unload from beginning of tape sequence of instructions (not shown) is executed via a BAL. Then microprocessor 80 at 2BD2 sets part 3 of unload key in the F key register (not shown but in WS). Then the tape is wound onto the spool (not shown) of data cartridge 12 as initiated by microprocessor 80 executing the instruction 2BD8. Then at 2BDA, the shell or cover (not shown) is put back on the spool (not shown) closing data cartridge 12. These instructions enable microprocessor 80 to command DRD to actuate its own internal mechanical sequencing as described in the referenced patents.

Finally, a branch instruction 2C04 enables microprocessor 80 to detect whether or not the tape spool is rotating. If not, the unload key is checked by referring to the index sequence of instructions of FIG. 8 via a BAL at 2C9A. The rotor (not shown) is stopped via the instruction at 2C9E. The program of FIG. 6 is then exited.

If the tape spool is not rotating, as indicated by the 1 output of branch instruction 2C04, the indexer of the above referenced patents is ready to be actuated for moving the data cartridge 12 to an unloading position. Then microprocessor 80 at 2C0A sets the indexer to move. A BAL instruction at 2C6E calls index program of instructions 97. Program 97 will not be further described as it follows the same principles set forth with respect to practicing the present invention as the other described programs. Completion of the index program 97 causes the microprocessor 80 at 2C78 to check the unload key. Then the null state of the index mechanism is checked via a branch and link instruction for verifying that the indexing was successfully performed. Then microprocessor 80 at 2C96 calls a thread and load program via that B&L instruction for loading a newly received data cartridge (not shown) into indexer 13 simultaneously to unloading data cartridge 12. Then the program is exited.

The search operation in DRD described with respect to FIG. 7 corresponds to block 92 of FIG. 5. The search operation rapidly moves tape (not shown) of data cartridge 12 to an addressed location. Microprocessor 80 zeroes the search at 12BC. Microprocessor 80 at 12C2 gets the search master keys, i.e. the search operation requires two master keys A3 and 74. At branch instruction 12FA, microprocessor 80 checks whether or not the unload of the tape from the data cartridge 12 was successful. This check is achieved by checking whether or not the tape was on the machine spool (not shown). If it is unloaded, then microprocessor 80 at 12FE set BOTs (beginning of tape) indicator. If not, a target address is set at 130A by microprocessor 80. Then the microprocessor at 1324 sets part 1 of the search key. Then microprocessor 80 calculates the high speed move parameters beginning at 1332. Such calculations are well known and are not described for that reason. Then microprocessor 80 completes the search key generation at 1336 and calls the key check program 93 at 1368. Key check program is later described with respect to FIG. 8. The capstan motor M in DRD is then turned on by microprocessor 80 at 136A. Capstan speed control is initiated by microprocessor 80 at 1382. The key match is checked at branch instruction 1410. If there is no match, the motor M1 is turned off at 14B2 and an error flag (not shown) is set. The program is exited for error recovery procedures. If there is a successful match at branch instruction 1410, microprocessor 80 at branch instruction 1413 checks to see whether or not the tape is near the target address. If not, the loop consisting of instructions 1382, 1410, 1413 is repeated until the target address is being approached. As the target is approached, microprocessor obtains the search master key 74 at 1416. The deceleration step is calculated at 1420 using normal calculation techniques. The decelerate key is set at 1423 with deceleration control being executed at 1425 using usual servo control techniques of programmed computers. Microprocessor 80 at branch instruction 14A1 verifies the key match. If there is a mismatch, an error is called as aforedescribed with respect to 14B2. A successful match results in determining at 14A3 whether or not the target address has been reached. If the address was not reached, the loop 1420-14A3 is repeated until the deceleration of the tape to the address tape position is completed. Such tape positioning is well known and not described for that reason. Upon reaching the target address, the program is exited for executing the next sequence of operations.

FIG. 8 illustrates the key check program 93. At 15A8 microprocessor gets the master key. The key match is checked for 0 at 15AA. If it is equal to 0, the program returns for further key generation. If the key is not zero, a key match is checked at 15B0. If there is no match, the program returns to the calling program. If there is a match, then a safe flag or "Okay to Go" is set at 15B6. Not setting the "Okay to Go" flag can result in an error condition.

FIG. 9 illustrates a profile program, that is, this is the program of instructions used to control the acceleration of the capstan motor M1 from stop to operating speed. The key check program is called at BAL 16D1. If the key check was successful, as indicated by the "Okay to Go" signal, then the speed control loop beginning at 16D6 is entered. This is a loop of instructions wherein the speed of the capstan motor M is compared with the table for profiling the operation of the motor acceleration. This type of computer control is well known and not critical to the invention so it is not further described.

FIG. 10 illustrates the TOS program which begins at 2CAC and enables the microprocessor 80 to turn on the spool motor (not shown) at 2D50. This spool motor is the motor (not shown) that spins the spool of data cartridge 12. The microprocessor 80 executes branch instruction 2D5C to determine if the tape is now wrapping on the spool for unloading the cartridge. If not, an error condition exists and the unit check or error flag is set by microprocessor 80 at 2D70. If the tape is wrapped on the spool of data cartridge 12, then microprocessor 80 at 2D74 sets part 3 of the unload key and exits the program back to the FIG. 6 illustrated sequence of instructions.

The shell program, i.e. the control program that controls taking the shell or cover from the data cartridge 12 or restores it thereon, is shown in FIG. 11. Microprocessor 80 enters the program at 2D8A. The DRD error flag is checked at branch instruction 2D92. If there is an error, the program is exited. If the DRD is error-free, microprocessor 80 checks the unload key by the BAL instruction at 2D9E to keycheck program 93. Then at 2DA0, the indexer 13 of the DRD which moves the data cartridge into loading and unloading position, is set up. Whether or not the indexer 13 was set up properly is checked by the microprocessor 80 at 2DA8. The rotation of the indexer 13 moves the shell onto the spool of the data cartridge for closing the data cartridge 12, all as started at the instruction 2DAC. This action completes the operation of restoring the cover (not shown) onto the data cartridge 12. On the other hand, if the indexer 13 is not ready to rotate, as indicated by branch instruction at 2DA8, microprocessor 80 at 2DB2 enters into a retry. Retry is achieved by the microprocessor 80 via the instructions at 2DBE for backing index. The unload key is down checked, that is, the successful operation of the indexer is removed by subtracting that portion of the key generator from the partially generated key. Then the indexer 13 is reset at 2DC2. The indexer error condition is checked at 2DC6. If there is no error indicated by the indexer or the number of retries has not exceeded a preset number, as 5, then microprocessor 80 reexecutes 2D9E. If there is an error after 5 retries, the program is exited.

The retry control at 2DB2 includes a count such that the retrys are limited, that is, upon the fifth retry an error condition is set such that the branch instruction execution at 2DC6 causes the program to be exited for executing error recovery procedures not pertinent to the practice of the present invention but necessary for ensuring the proper operation of the DRD.

Figure 12:
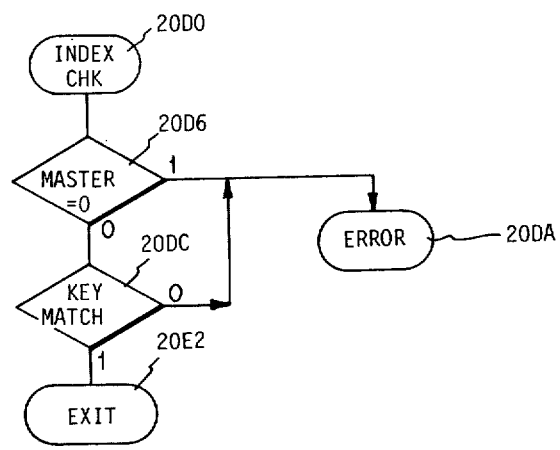
FIG. 12 is a logic flow diagram showing indexed checking for the rotary portion of the FIG. 1 illustrated automatic recorder.

FIG. 12 is a simplified flow diagram of the index check program 98. Microprocessor 80 enters the program at 20D0. The master key is checked for equality at branch instruction 20D6. If it is not equal to 0, then at 20DC, microprocessor 80 checks for a successful key match. If there is a match, the program is exited indicating successful operation of the indexer 13. On the other hand, if there is no key match or the master is equal to 0, an error condition is indicated at 20DA.

Based on all of the above, it is apparent that the present invention can be successfully practiced in either a hardware mode or a program mode. A program mode as illustrated contemplates the programmable digital computer such as the Motorola M6800 or its equivalent or any standard digital computer. Further, the programming can be implemented in programmable logic arrays, read only memories and the like. The details of the illustrated embodiment are best understood by reference to the patents incorporated by reference.

While the invention has been particularly shown and described with reference to preferred embodiments thereof, it will be understood by those skilled in the art that various changes in form and details may be made therein without departing from the spirit and scope of the invention.

We claim:

1. The method of verifying proper execution of sequential control functions used for controlling a device, the steps of:
    accessing a control program having a plurality of instruction words for enabling execution of a sequence of control steps;
    storing a check key at a predetermined memory location having a predetermined address relationship to an end instruction word location of said control program to be executed,
    executing said control program in a programmable controller whereby said device is operated in accordance with said control program, at predetermined points of said execution of said control program generating portions of said check key whereby at said last instruction word location generated check key is generated whenever said control program has been correctly executed, and
    comparing said generated check key with said stored check key for verifying proper programmed control of said device.

2. The method of checking nested control functions by independently verifying proper execution of sequential control functions at each nested level independently using the method set forth in claim 1 for each said nested level.

3. A sequencer for sequencing operations of a device being controlled in a sequence of operations, the improvement including in combination:
    a sequencing mechanism having a plurality of sequencing states;
    means establishing an initiate signal in said sequencing mechanism and a supplied check key for said sequencing mechanism;

means responsive to said initiate signal to actuate said sequencing mechanism;

means storing said supplied check key;

a plurality of check means in said sequencing mechanism respectively responsive to different ones of said sequencing states to generate a predetermined portion of said supplied check key;

means connected to said plurality of check means for accumulating said predetermined portions of said check key to supply a generated check key; and means operative at a predetermined one of said sequence states to compare said generated check key with said supplied check key for verifying operation of said sequence in controlling said device in said sequence of operations.

4. The sequence set forth in claim 3 further including a subsequencer having a second plurality of sequencing states, independent verifying means operable with said subsequencer comprising:

means establishing a sub-initiate signal in said subsequencing mechanism and a supplied subcheck key for said subsequencing mechanism;

means responsive to said sub-initiate signal to actuate said subsequencing mechanism;

means storing said subcheck key;

a plurality of subcheck means in said subsequencing mechanism respectively responsive to different ones of said subsequencing states to generate a predetermined portion of said subcheck key;

means connected to said plurality of subcheck means for accumulating said predetermined portions of said subcheck key to supply a generated subcheck key; and means operative at a predetermined one of said subsequence states to compare said generated subcheck key with said supplied subcheck key for verifying operation of said subsequence in controlling said device in said subsequence of operations, all independent of said sequence of operations.

5. The method of operating a sequential state machine operble only in predetermined sequences of operations, the steps of:

receiving a command set of signals indicating one or more machine sequences to be executed;

decoding said command set of signals and selecting a machine sequence indicated thereby;

fetching a check key set of signals associated with said selected machine sequence and storing same, reset a function key register to a reference state, then; repeat steps (1) through (3) inclusive until said machine sequence has been completed:

(1) perform a predetermined portion of said machine sequences in accordance with step repetition;

(2) upon completion of such predetermined portion, generate a corresponding function key portion;

(3) fetch the signal contents of said function key register and alter the signal contents thereof by said function key portion whereby an accumulated function key is generated in accordance with a number of repetitions of steps (1), (2) and (3);

upon completion of said machine sequences compare the signal contents of said function key register with said check key set of signals, detecting a predetermined relationship from said comparison to indicate successful completion of said machine sequences in the order of repetition of said step (1).

6. The method set forth in claim 5 further including timing out certain of said repetitions of step (1) for detecting fault conditions within each such repetition, and indicating a fault when there is a time out before completion of such timed repetition.

* * * * *